United States Patent [19]
Numata et al.

[11] 3,961,341
[45] June 1, 1976

[54] AUTOMATIC SHUTTER SPEED CONTROL MEANS FOR A CAMERA

[75] Inventors: Saburo Numata; Shinichiro Fujino, both of Urawa, Japan

[73] Assignee: Fuji Photo Optical Co., Ltd., Japan

[22] Filed: Dec. 11, 1974

[21] Appl. No.: 531,601

[30] Foreign Application Priority Data
Dec. 13, 1973  Japan............................ 48-140962

[52] U.S. Cl. .................................. 354/51; 354/60 L
[51] Int. Cl.² .......................................... G03B 7/08
[58] Field of Search ............ 354/50, 51, 60 R, 60 L

[56] References Cited
UNITED STATES PATENTS

| | | | |
|---|---|---|---|
| 3,769,887 | 11/1973 | Nabusawa............................ | 354/51 |
| 3,805,278 | 4/1974 | Matsuzaki et al...................... | 354/33 |
| 3,821,754 | 6/1974 | Nabusawa.......................... | 354/51 X |
| 3,842,425 | 10/1974 | Kitai ..................................... | 354/51 |
| 3,860,936 | 1/1975 | Harvey.................................. | 354/51 |

Primary Examiner—Joseph F. Peters, Jr.
Attorney, Agent, or Firm—Harold L. Stults; Donald P. Gillette

[57] ABSTRACT

An automatic exposure control circuit which controls the shutter speed in accordance with the output of a light measuring circuit including a photodetector which detects the level of scene brightness. The output of the photodetector is memorized by a memorizing capacitor and the shutter speed control circuit is operated in accordance with the memorized output. The memorized level is shifted to a predetermined level when the memorized level is below a predetermined level which corresponds to a limit of scene brightness which can be photographed. A switching circuit and a shifting circuit connected therewith are connected with an end of the memorizing capacitor so that the level of the memorized output may be shifted by the shifting circuit when the level memorized by the capacitor is below a predetermined level. The shutter speed is therefore determined regardless of the scene brightness when the level of the scene brightness is below a predetermined level.

2 Claims, 1 Drawing Figure

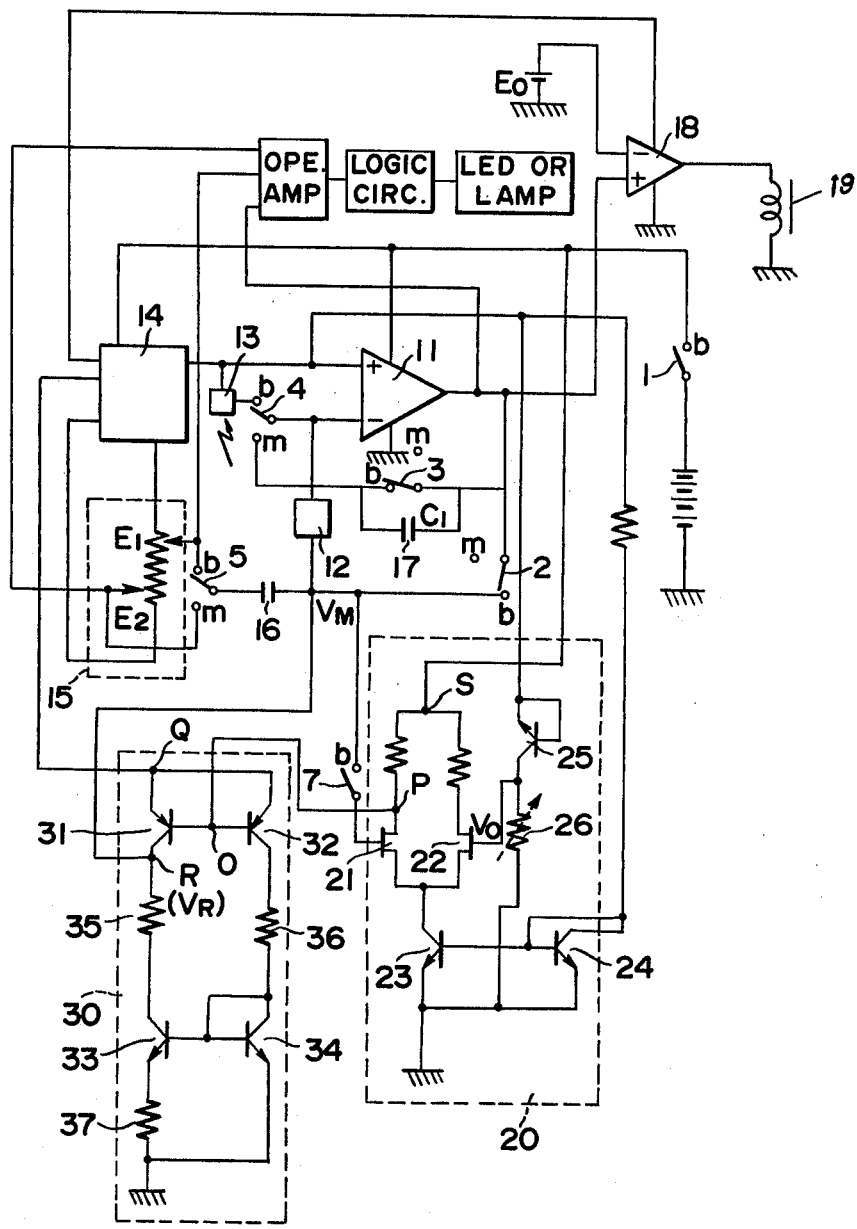

AUTOMATIC SHUTTER SPEED CONTROL MEANS FOR A CAMERA

BACKGROUND OF THE INVENTION

1. Field of the Invention

This invention relates to an automatic shutter speed control means for a camera, and more particularly to a shutter speed control means in which the shutter speed, which is automatically determined in accordance with an outpout of an exposure measuring circuit, is corrected when the level of scene brightness is below a predetermined level.

2. Description of the Prior Art

It has been known to control the shutter speed by an electric exposure control circuit in which the level of scene brightness is converted to an electric value by use of a photodetector, and the electric value is memorized as a function of the level of the scene brightness, and the shutter speed is controlled in accordance with the memorized value. In such a shutter speed control circuit, it is common to use a silicon photocell as the photodetector, and use an electromagnet to operate a mechanical shutter in accordance with the electric output of the photocell. The photocell is connected to the shutter by a switching circuit which, in turn, is connected to the photocell by a time constant circuit that includes an integrating capacitor. Particularly in the memory type exposure control circuit, it is known to use a logarithmic diode to convert the output current from the photodetector to an electric voltage to be memorized by the memorizing circuit. The logarithmically converted electric voltage is applied to a time constant circuit that includes an integrating capacitor, and an electromagnet, which is connected with the time constant circuit through a switching circuit, is operated by the output of the time constant circuit.

The quality of the electric elements used in the electric shutter control circuit has now been much improved. Particularly, the dielectric losses of the integrating capacitor and the memorizing capacitor have been reduced. In addition, the dark current of a photocell has been reduced to about one hundredth of prior values, and the stray capacity has been reduced to about one tenth of prior values, and the leakage current of a MOS type FET has also been lowered. Accordingly, the functional conversion by a logarithmic diode is now possible, even when the photocurrent is as low as about $10^{-12}$ to $10^{-13}$A if an operational amplifier using these kinds of improved elements is employed. Therefore, it has become possible to control the exposure time for an extremely low level of scene brightness.

However, the progress and improvements in the shutter speed control circuit have brought about various problems as follows.

If the level of scene brightness is measured by a full aperture measuring system, the minimum level of scene brightness that can be measured by the circuit to control the shutter speed is extremely low. Therefore, it often occurs that the exposure time to be effected actually is objectionably long, e.g. several seconds or several tens of seconds, which is sometimes undesirable from the viewpoint of the practical use of the camera. Further, it sometimes happens that the shutter speed is even controlled for a level of scene brightness below the minimum limit of photographing.

The objectionably long exposure time wastes the driving power of the automatic exposure control camera and thus drains the battery too quickly. Furthermore, the shutter may even be released when no light is incident on the camera, for example when the lens cap is on the taking lens of a single lens reflex camera having this kind of exposure control circuit. If the shutter is released when the photodetector receives no light, the shutter is held open and will not be closed until the electric circuit is turned off by some means. The drain on the battery continues until the shutter is closed.

From the viewpoint of saving the power of the camera, it is desirable to provide a camera with an automatic exposure control of the type in which the shutter is automatically closed when the shutter speed is below a predetermined level.

SUMMARY OF THE INVENTION

It is the primary object of the present invention to provide an automatic shutter speed control means that terminates the exposure before the exposure time controlled by an electric exposure control circuit has elapsed, when the level of scene brightness is below a predetermined level.

Another object of the present invention is to provide an automatic shutter speed control means in which the shutter speed is controlled in accordance with the level of scene brightness when the level of scene brightness is above a predetermined level, but the shutter speed is not allowed to drop below a predetermined value even when the scene brightness is below a predetermined level.

The shutter speed control means in accordance with the present invention comprises a light measuring and memorizing circuit which detects the level of the scene brightness and converts the level into an electric value which is memorized in a memorizing element with reference to the film sensitivity of the film loaded in the camera, an electric value shifting means which automatically changes the electric value memorized by said memorizing element to a predetermined value when the level of the scene brightness is below a predetermined level, a switching circuit which operates in accordance with the memorized electric value of the value shifted by said shifting means, and an electromagnetic operating means which operates to terminate the exposure by a shutter mechanism in response to the operation of said switching circuit, whereby the shutter speed is determined regardless of the level of scene brightness when the scene brightness is below a predetermined level.

The above-mentioned objects, features and advantages as well as other objects and features which will be made apparent from the description of the preferred embodiment of the invention made hereinafter will be understood from the detailed description of the invention made hereinbelow with reference to the accompanying drawing in which a single FIGURE shows an electric circuit of the automatic shutter speed control means in accordance with an embodiment of the present invention.

PREFERRED EMBODIMENT OF THE INVENTION

Now referring to the drawing, which is a schematic circuit diagram of one embodiment of the present invention, the well known elements for an electric shutter such as an electromagnet, a switching circuit for supplying a signal to the electromagnet, and so forth are omitted, since they are not directly related to the gist of the present invention and are well known in the art.

In the drawing, when the circuit is in the measuring state, the contacts of five switches 1, 2, 3, 4 and 5 are all in the b position. The off-set voltage of an operational amplifier 11 is zero and the gain and the input impedance are sufficiently high. In such a condition, the output of the operational amplifier 11 is fed back to the inverting input terminal of the operational amplifier 11 by way of a logarithmic diode 12 to effect a negative feedback operation. The inverting input terminal of the operational amplifier 11 is also connected to one terminal of a photodiode 13. The other terminal of the photodiode is connected to the non-inverting input terminal of the operational amplifier 11.

The photocurrent generated in the photodiode 13 flows through the logarithmic diode 12, and a voltage which is a logarithmic function of the amount of light incident to the photodiode 13 is obtained across the logarithmic diode 12. By forming a negative feedback circuit as shown in the drawing, the voltage difference between the contact b of the fourth switch 4 and the non-inverting input terminal of the operational amplifier 11 becomes zero and the photodiode 13 becomes equivalent to a short circuit and the short-circuit current thereof flows into the logarithmic diode 12. A voltage which is a function of the scene brightness $I_L$ is impressed on the capacitor 16 and is memorized thereby. The voltage $V_M$ memorized by the capacitor 16 is represented by a formula; $V_M = (V - E_1)$. where the output voltage of the operational amplifier 11 appearing at the contact b of the second switch 2 is V and the voltage appearing at the contact b of the fifth switch 5 is $E_1$.

A memorized electric voltage shifting means 30 is operated by a switching means 20 which is controlled by the level of the electric $V_M$ memorized by the memorizing capacitor 16. The switching means 20 is connected to a terminal of the memorizing capacitor 16 by way of a seventh switch 7 and comprises a circuit consisting of a first transistor 21 and the gate input of which has the memorized voltage $V_M$ (acutally $V_M+E_2$) applied to it, and a second transistor 22, the gate input voltage of which is a constant voltage Vo. The switching means 20 further includes a constant current circuit consisting of a third transistor 23 and a fourth transistor 24. The first transistor 21 is nonconductive when the memorized voltage is not higher than the constant voltage Vo, and accordingly, the voltage $V_P$ at the point P is substantially equal to the constant voltage input $V_S$ at the point S. When the memorized voltage is higher than the constant voltage Vo., the first transistor 21 is conductive and the potential at the point P is lowered.

The voltage $V_P$ at the point P of the switching means 20 becomes the base input voltage of the fifth and sixth transistors 31 and 32. The potential difference between the constant voltage input point S of the switching means 20 and the emitter terminal Q of the fifth and sixth transistors 31 and 32 is set in advance to make the transistors 31 and 32 nonconductive. Then when the first transistor 21 becomes conductive when the memorized voltage $V_M$ becomes higher than the constant voltage Vo, the voltage at the point P falls and the base voltage of the transistors 31 and 32 also falls to make the transistors 31 and 32 conductive, and the transistors 33 and 34 are also turned on. Therefore, the voltage $V_R$ at the point R, that is the memorized voltage $V_M$, is shifted to a voltage determined by resistors 35 and 37.

On the other hand, when the memorized voltage $V_M$ is not higher than the constant voltage Vo, the transistor 21 is nonconductive, and consequently the voltage at the point P is substantially constant and is equal to the voltage at the point S. As a result, the transistors 31 and 32 are nonconductive, and the transistor 33 is also nonconductive. Since no current flows through the resistors under 35 and 37 under such conditions, the memorized voltage $V_M$ memorized by the capacitor 16 remains at its original level.

The constant voltage Vo is determined in advance to correspond to the limit of scene brightness for photographing (the lower limit of scene brightness which can be photographed) and the resistance of the resistors 35 and 37 is properly determined so that the voltage $V_R$ at the point R may define a maximum exposure time, regardless of the scene brightness, when the transistors 31 and 33 are turned on. The memorized electric voltage shifting means 30 constructed as described above serves to shift the memorized voltage $V_M$ to the constant voltage $V_R$ at the point R when the memorized voltage is higher than the constant voltage Vo.

In operation of the shutter speed control means in accordance with the present invention as described above, the mechanism and the circuit for controlling the shutter are operated in accordance with the following steps.

1. The first switch 1 is closed and an electromagnet (not shown) starts to be energized to hold the trailing blind of the shutter (not shown) of known construction.
2. A mirror is swung up out of the optical path, and the arms of the switches 2, 3, 4 and 5 are caused to engage their respective contact b.
3. Then the second switch 2 is opened by moving the movable contact thereof away from the contact b.
4. The arm of fourth switch 4 is switched over from contact b to its contact m.
5. The fifth switch 5 is switched over from its contact b to its contact m.
6. The seventh switch 7 is closed to shift the memorized voltage memorized by the memorizing capacitor 16. The memorized voltage $V_M$ is not higher than the constant voltage $V_0$, the memorized voltage across the capacitor 16 is maintained as it is.
7. When the leading blind of the shutter starts to move, the third switch 3 is opened and the integrating capacitor 17 starts to be charged.
8. When the output of the operational amplifier 11 reaches a predetermined voltage, the output voltage of a comparator 18 is reversed and the electromagnet 19 mentioned previously is deenergized to release the trailing blind of the shutter. Thus, the shutter is closed and the exposure is completed.
9. The mirror is returned to the reflecting position.

In the above described steps of the operation of the shutter speed control means of this invention, the capacitor 17 keeps its charge after the second switch 2 is opened in the third step. Thus, the integrating capacitor 17 memorizes the voltage charged so far. When the fourth switch 4 is switched over from the contact b to the contact m in the fourth step, the current corresponding to the current which has been flowing through the operational amplifier 11 flows into the logarithmic diode 12 through the contact b of the third switch 3 to provide the output voltage V, and the integrating capacitor 17 is short-circuited.

In the fifth step, the fifth switch is switched over from the contact $b$ to the contact $m$. When the contacts $b$ and $m$ are of the same potential, the switch over of the fifth switch 5 does not cause any change in the voltage $V_M$ and, accordingly, in the current flowing through the logarithmic diode 12 since the voltage to which the capacitor 16 is charged does not change owing to the large capacitance thereof. Although the voltage across the memorizing capacitor 16 is to be changed by the current flowing through the diode 12, the change can be considered to be negligibly small by making the capacity of the capacitor 16 extremely large.

In the sixth step, the voltage memorized by the memorizing capacitor is shifted to $V_R$ when the memorized voltage $V_M$ is higher than the constant voltage Vo. Simultaneously with the start of the leading blind of the shutter, the third switch 3 is opened and the current which has been flowing through the logarithmic diode 12 starts to charge the integrating capacitor 17 in the seventh step. When the output voltage V exceeds the constant voltage source level E, the output of the comparator 18 is inversed and the magnet 19 is deenergized to release the trailing blind in the eighth step. Thus, movement of the trailing blind is started so as to close the shutter.

The time $t$ which lapses until the output voltage V reaches the level of the constant voltage source is represented by the formula; $t = f(E)/KI_L \cdot C_1$, which means that the exposure time $t$ is inversely proportional to the scene brightness $I_L$ and accordingly the film is always properly exposed in accordance with the level of the scene brightness.

If the potentiometer 15 is in such a position as to effect a potential difference between the contacts $b$ and $m$ of the switch 5, the potential difference $E_2$ is added to the voltage memorized by the memorizing capacitor 16 when the switch 5 is switched over from the contact $b$ to the contact $m$ in the fifth step 5. Therefore, the current corresponding to the voltage with the added potential difference flows through the logarithmic diode 12.

We claim:

1. A shutter speed control means for controlling operation of shutter mechanism of a camera wherein the scene brightness is detected by a detecting means including a photodetector, and the exposure time is controlled by a shutter control circuit which operates in accordance with the output of said photodetector, said control means comprising: a timing capacitor connected to said shutter mechanism to control the operation thereof under certain conditions; memorizing means to memorize the output voltage of said photodetector; level shifting means to shift the memorized output voltage to a shutter control circuit operating level when the level of the output voltage memorized by said memorizing means is below a predetermined level, thereby operating said shutter control circuit in accordance with the shifted level, whereby the shutter speed is controlled in accordance with the predetermined shifted level when the scene brightness is below a predetermined level.

2. A shutter speed control means for a camera as defined in claim 1 wherein said memorizing means comprises a memorizing capacitor; and a switching circuit connected to one terminal of said memorizing capacitor to compare the voltage across the memorizing capacitor with a constant voltage and generate a shifting signal when the memorized voltage is not higher than the constant voltage, and a shifting circuit connected to said switching circuit to be controlled thereby and connected to said memorizing capacitor to shift the potential at said terminal of the memorizing capacitor when the shifting signal is given thereto.

* * * * *